United States Patent
Park et al.

(10) Patent No.: US 8,036,174 B2
(45) Date of Patent: Oct. 11, 2011

(54) WIRELESS MULTICASTING SERVICE METHOD USING RELAYED TRANSMISSION SCHEME

(75) Inventors: Juyoung Park, Daejeon (KR); Shin Gak Kang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 963 days.

(21) Appl. No.: 11/928,568

(22) Filed: Oct. 30, 2007

(65) Prior Publication Data

US 2008/0130577 A1   Jun. 5, 2008

(30) Foreign Application Priority Data

Dec. 5, 2006 (KR) .................. 10-2006-0122226

(51) Int. Cl.
*H04W 4/00* (2009.01)
(52) U.S. Cl. ......... 370/331; 370/332; 370/334; 370/338
(58) Field of Classification Search .................. 370/312, 370/328, 331, 332, 342, 390, 473, 334, 338; 455/3.01; 705/400
See application file for complete search history.

(56) References Cited

U.S. PATENT DOCUMENTS

| 7,260,070 | B1 * | 8/2007 | Smith | 370/328 |
| 7,546,082 | B2 * | 6/2009 | Chennikara et al. | 455/3.01 |
| 7,733,909 | B2 * | 6/2010 | Kallio et al. | 370/473 |
| 2005/0283447 | A1 * | 12/2005 | Xu et al. | 705/400 |
| 2006/0262793 | A1 * | 11/2006 | Vare et al. | 370/390 |
| 2008/0069071 | A1 * | 3/2008 | Tang | 370/342 |

FOREIGN PATENT DOCUMENTS

| KR | 1020020050907 | 6/2002 |
| KR | 1020050075627 | 7/2005 |
| KR | 1020050075645 | 7/2005 |
| KR | 10-2006-0034607 | 4/2006 |
| KR | 1020060084749 | 7/2006 |

OTHER PUBLICATIONS

An Efficient Data Delivery Information Exchange for Reliable Wireless Multicasting, Ji Y. Lim et al., *Korean Information and Communications Society*, vol. 27, No. 1C, pp. 59-68, 2002.

* cited by examiner

*Primary Examiner* — Hassan Kizou
*Assistant Examiner* — Toan Nguyen
(74) *Attorney, Agent, or Firm* — Rabin & Berdo, P.C.

(57) ABSTRACT

A wireless multicasting service method using a relayed transmission scheme is provided. In the wireless multicasting service method, a mobile node moves from a first wireless network to a second wireless network. Then, the mobile node performs a new joining request to a mobile multicast agent managing a multicasting service in the second wireless network. If the mobile node receives a joining approval for the new joining request, the mobile node performs a secession request to a previous mobile multicast agent managing a multicasting service in the first wireless network.

13 Claims, 13 Drawing Sheets

WIRELESS MULTICASTING SERVICE METHOD USING RELAYED TRANSMISSION SCHEME

CLAIM OF PRIORITY

This application claims the benefit of Korean Patent Application No. 10-2004-122226 filed on Dec. 5, 2006 in the Korean Intellectual Property Office, the disclosure of which is incorporated herein by reference.

BACKGROUND OF THE INVENTION

1. Field of the Invention

The present invention relates to a wireless multicasting service method using a relayed transmission scheme for effectively providing multicasting services without modifying a conventional network structure in the Internet environment where wired or wireless networks are integrated.

This work was supported by the IT R&D program of MIC/IITA[2006-P10-40, System and method for providing multicast service in a mobile network by using relayed multicast]

2. Description of the Related Art

As a communication technology has been advanced, a user is allowed to easily access the Internet through a wired or a wireless link. Due to such an easy Internet access, the demands of users have been advanced from text based services to multimedia data services. The multimedia data service basically requires high capacity data transmission. Especially, a wireless multimedia group communication service, for example, a mobile IPTV, requires high capacity multimedia data to transmit in a comparatively narrower wireless environment. When a plurality of receivers are present at the same mobile network, it needs to protect the network resources from being wasted by high capacity multimedia.

Figure 1:
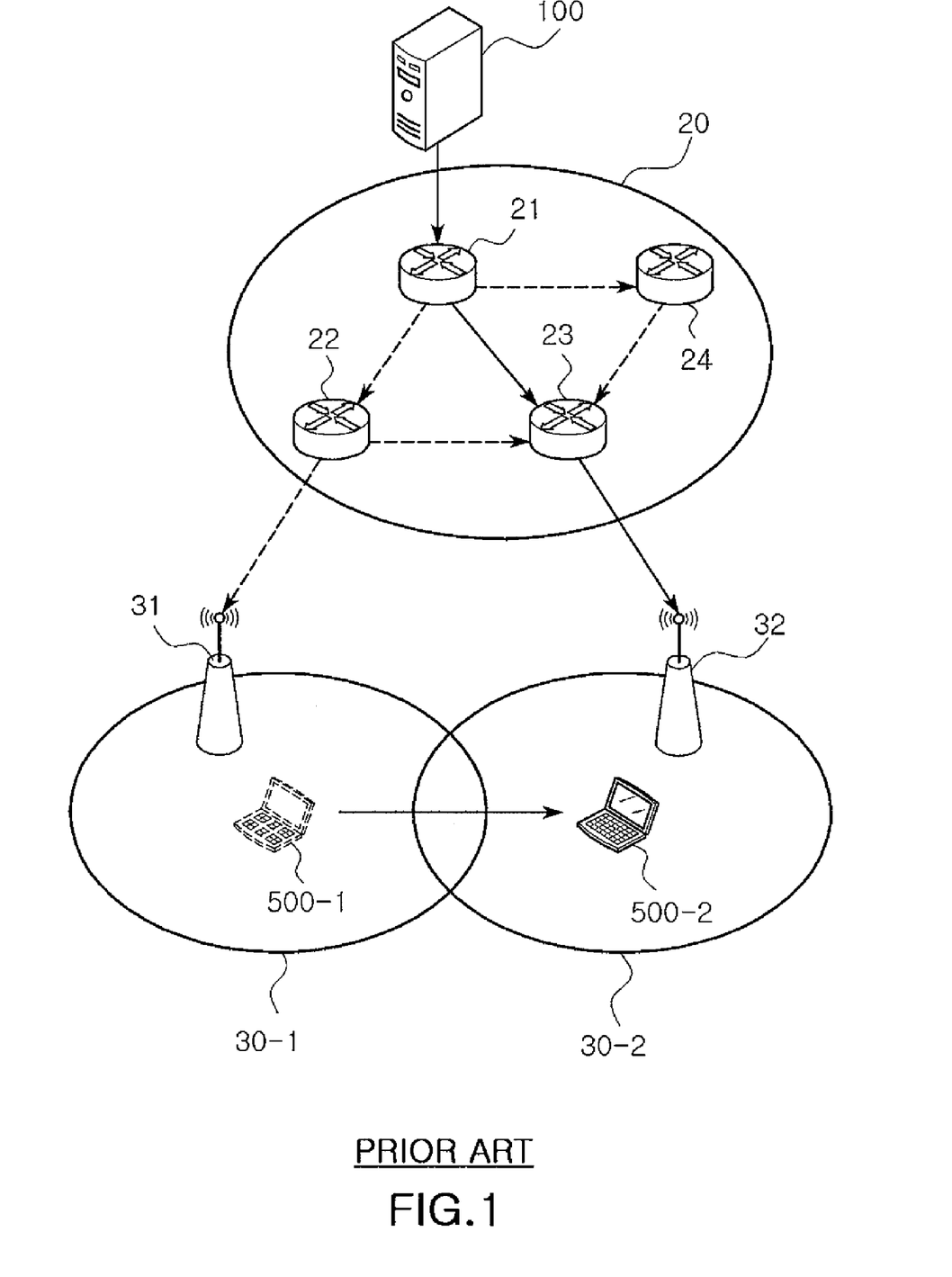
FIG. 1 is a diagram illustrating a system for providing a multicasting service in a wired and wireless integrated Internet environment according to the related art.

A wireless multicasting service was introduced as a mechanism to effectively support the above described services. FIG. 1 is a diagram illustrating a system for providing a multicasting service in a wired and wireless integrated Internet environment according to the related art.

Referring to FIG. 1, the system includes a multicast data sender 100 for transmitting data, a plurality of mobile nodes 500-1 and 500-2 for receiving data transmitted from the sender 100, mobile networks 30-1 and 30-2 for enabling the mobile nodes MN 500-1 and 500-2 to transmit and receive data through a wireless link, and a multicast network 20 having a plurality of multicast routers 21, 22, 23, and 24 between the sender 100 and the mobile networks 30-1 and 30-2.

A multicast tress that is a data transmission path among the multicast routers is set in the multicast network 30. When the sender 100 transmits predetermined data to the mobile nodes 500-1 and 500-2 joining to the multicast routers 21, 22, 23, and 24 through an internet group management protocol (IGMP), the data is transferred to the predetermined mobile nodes 500-1 and 500-2 through the corresponding multicast tree and the mobile network. Herein, when the mobile nodes 500-1 and 500-2 move to a new mobile network, the multicast tree in the wired network is required to be newly formed.

In order to provide multicasting services to a wired and wireless integrated Internet environment, a multicast network using multicast routers is required to be built by modifying the conventional network structure.

If a predetermined mobile node frequently moves to various locations in a wireless environment, the mobile node frequently performs handovers. According to the frequent handover, the multicast trees must be continuously modified.

SUMMARY OF THE INVENTION

The present invention has been made to solve the foregoing problems of the prior art and therefore an aspect of the present invention is to provide a method and apparatus for effectively providing multicasting services without modifying the conventional network structure.

It is another aspect of the present invention to provide a multicast service method and apparatus for rapidly performing a handover operation in a wired and wireless integrated Internet environment.

It is still another aspect of the present invention is to provide a multicast service method and apparatus for not requiring a data transmission tree to be reformed although a handover operation is rapidly performed in a wired and wireless integrated Internet.

According to an aspect of the invention, the invention provides a wireless multicasting service method using a relay transmission scheme including: performing a new joining request to a mobile multicast agent managing a multicasting service in a second wireless network if a mobile node moves from a first wireless network to the second wireless network; and performing a secession request to a previous mobile multicast agent managing a multicasting service in the first wireless network if the mobile node receives a joining approval for the new joining request.

According to another aspect of the invention, there is provided a wireless multicasting service method using a relay transmission scheme including: receiving a new joining request from a mobile node receiving a multicasting service from a neighbor wireless network; processing the join of the mobile node, when the multicasting service is provided; and joining a multicasting group related the multicasting service and processing the join of the mobile node, when the multicasting service is not provided.

According to still another aspect of the invention, there is provided a wireless multicasting service method using a relay transmission scheme including: receiving a join request for a multicasting service from a mobile multicast agent or a mobile node; confirming whether the mobile multicast agent or the mobile node joins to a session for the multicasting service; determining whether or not the mobile multicast agent or the mobile node is a valid subscriber that is allowed to join to a session for the multicasting service; and registering the mobile multicast agent or the mobile node for a subscriber list.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

Certain embodiments of the present invention will now be described in detail with reference to the accompanying drawings In order to clearly describe the present invention, the descriptions of well-known functions and elements are omitted. Like numeral references denote like element throughout the accompanying drawings.

It will be understood that when an element is referred to as being "connected" to the other element, it can be directly connected to the other element or it can be electrically connected with an element interleaved therebetween. Also, it will be understood that when an element is referred to as "including" the other elements, it can further include other elements.

Throughout the specification, a module denotes a unit of a predetermined function or processing a predetermined operation. The module can be embodied as hardware, software, or combination thereof.

Figure 2:
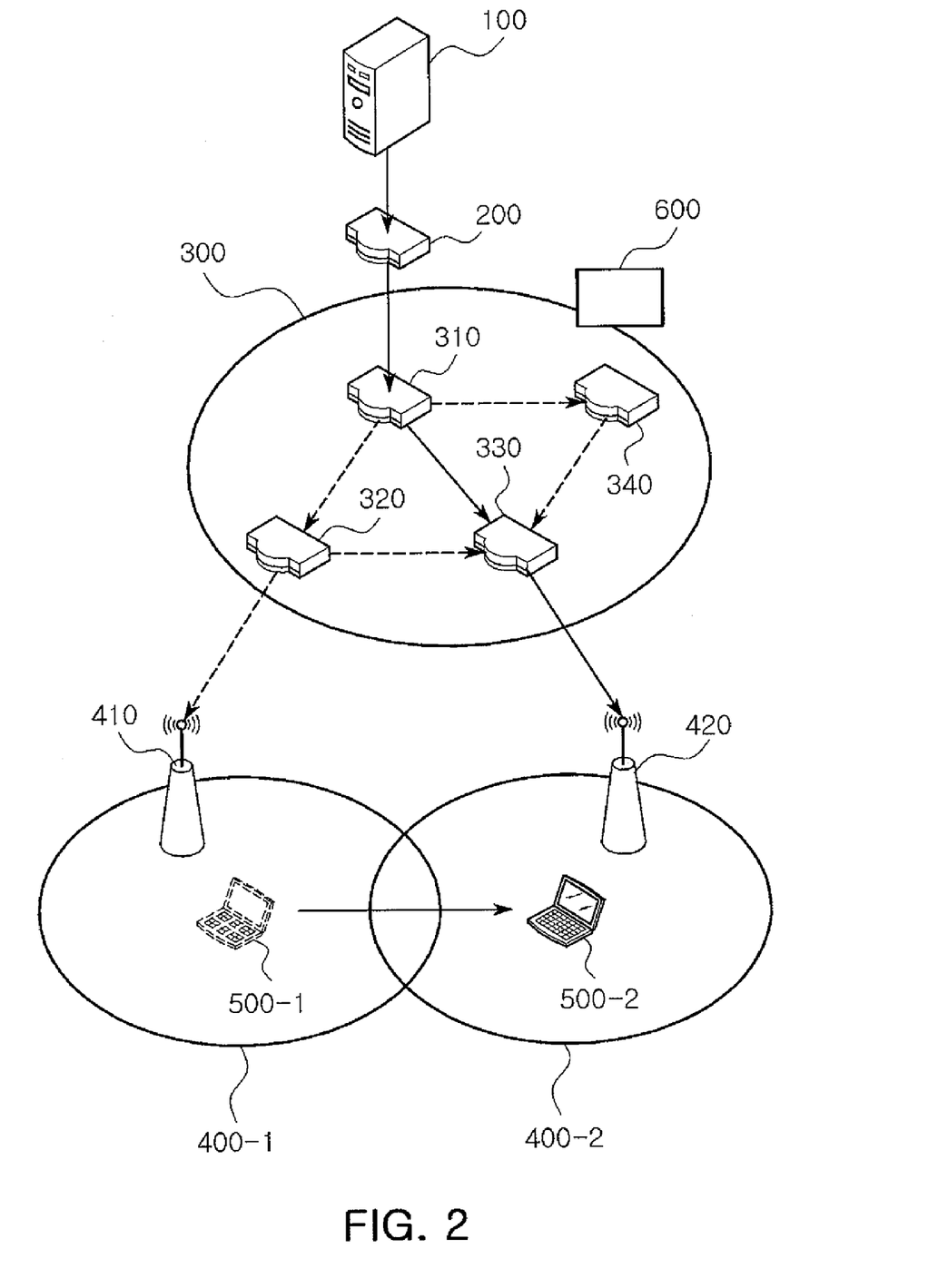
FIG. 2 is a diagram illustrating a system for providing a multicasting service in a wired and wireless integrated Internet environment according to an embodiment of the present invention.

FIG. 2 is a diagram illustrating a system for providing a multicasting service in a wired and wireless integrated Internet environment according to an embodiment of the present invention.

Referring to FIG. 2, the system according to the present embodiment includes a multicast data sender 100, a sender-side multicast agent (SMA) 200, multicast agents (MA) 310, 320, 330, and 340, mobile multicast agents (MA) 410 and 420, a session manager 600, and mobile nodes 500-1 and 500-2.

The multicast data sender 100 transmits multicast data in order to provide multicasting services in the wired and wireless integrated Internet environment, and the mobile nodes 500-1 and 500-2 joined to a session corresponding to the multicasting service receives the transmitted multicast data.

The multicast agents 310, 320, 330, and 340 are a node or a sever system that forms a multicast tree in response to the session manager 600 and actually relays the data. The sender-side multicast agent 200 denotes one among the multicast agents 310, 320, 330, and 340, which is included in the sender node or the network and directly receives data from the sender.

The session manager 600 is a device generally managing a unicast network formed of the sender-side multicast agent 200 and the multicast agents 310, 320, 330, and 340. The session manger 600 dose not participate to transfer the data. The session manager 600 only participates to form a tree among multicast agents. That is, the session manager 600 manages various session states of the multicast agents, such as a session creation state, a session termination state, a session joining approval state, and etc.

Herein, the session is a class D that is corresponding to an IPv4 multicasting group address. That is, the session denotes a group managed by the session manager. The session manager defines a unique group in a local host. One session is defined as a session ID, not an IP multicast address. The session ID is managed by a session manager in a centralized management scheme.

If handover is performed because the mobile node 500-1 receiving the multicast data from a mobile multicast agent 410 in the first wireless network 400-1 moves to the second wireless network 400-2, the mobile node 500-2 continuously receives multicast data corresponding to the multicasting service by newly joining to a foreign network including the mobile multicast agent 420 transmitting multicast data to the second wireless network 400-2.

Hereinafter, the basic operating mechanism of a mobile node and a mobile multicast agent will be described through FIG. 3 to FIG. 5.

Figure 3:
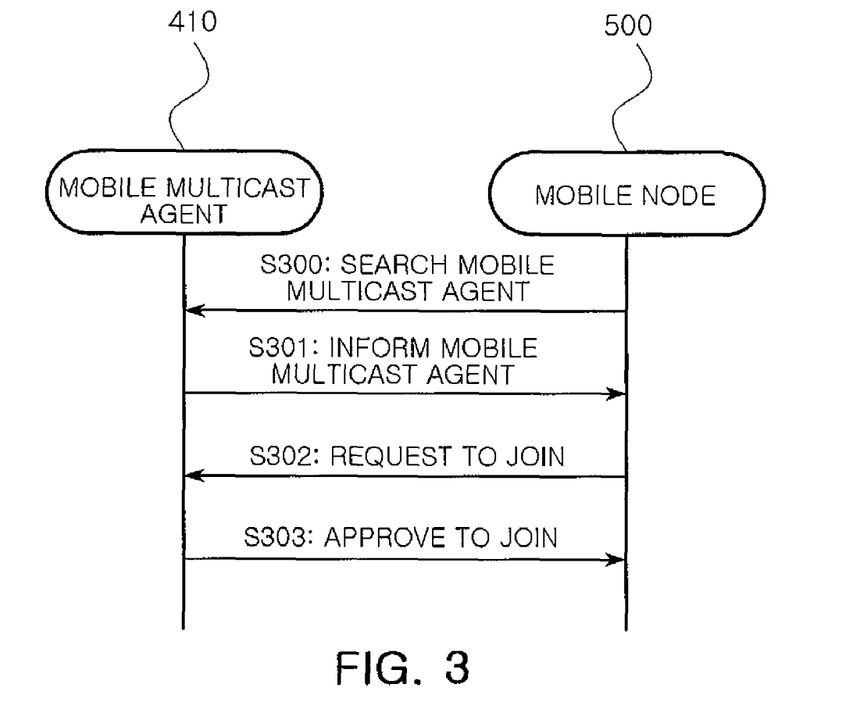
FIG. 3 is a flowchart illustrating a procedure that a mobile node newly joins to a mobile multicast agent transmitting multicast data.

FIG. 3 is a flowchart illustrating a procedure that a mobile node newly joins to a mobile multicast agent transmitting multicast data.

Referring to FIG. 3, the mobile node 500 confirms whether or not a mobile multicast agent 410 transmitting multicast data is present in the wireless network including itself at step S300. It is preferable that all control messages exchanged between the mobile node 500 and the mobile multicast agent 410 use offset multicast address, for example, '224.0.1.10'.

The mobile multicast agent 410 of the wireless network informs the mobile node 500 that a corresponding mobile multicast agent 410 is present in the wireless network in response to the conforming operation at step S301. At the step S301, the mobile multicast agent 410 can also provide information related itself to the mobile node 500. In the present embodiment, the provided information includes a identification (ID) of the mobile multicast agent 410, and a Quality of service (QoS) and a service renewal cycle (refresh), which can be provided from the mobile multicast agent 410.

The mobile node 500 received the message of step S301 requests the mobile multicast agent 410 to join a service at step S302. With the service joining request, the mobile node 500 provides the address information of a session to join such as a source address and a multicast address, join authentication information, information about a previous mobile multicast agent, and information about quality of service.

If the mobile multicast agent 410 approves the join request, the mobile multicast agent 410 transmits a joining approval message to the mobile node 500 at step S303. The joining approval message includes session address information, mobile multicast agent information, negotiated data profile information, and joining request renewal cycle time.

Figure 4:
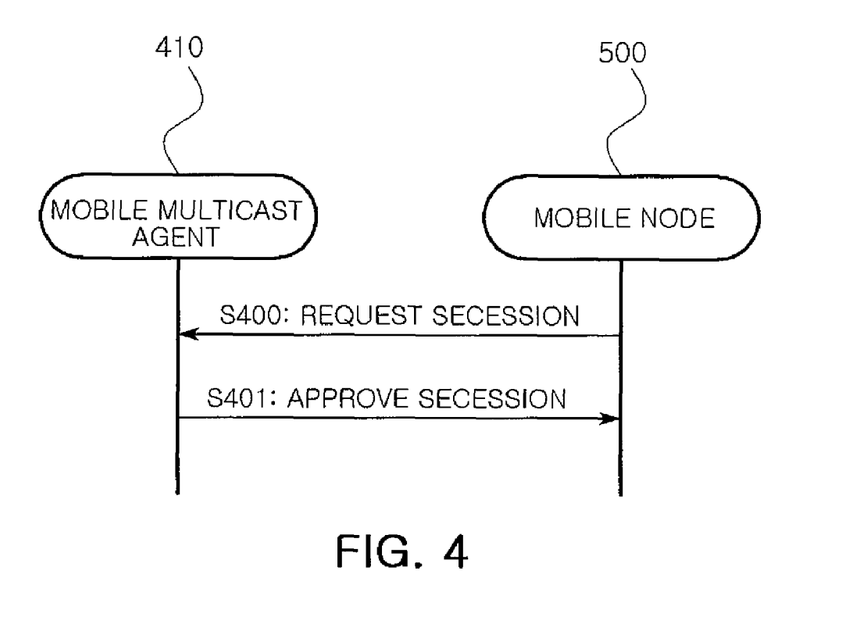
FIG. 4 is a flowchart illustrating a procedure that a mobile node secedes from a wireless network where a predetermined mobile multicast agent transmits multicast data.

FIG. 4 is a flowchart illustrating a procedure that a mobile node secedes from a wireless network where a predetermined mobile multicast agent transmits multicast data.

Referring to FIG. 4, the mobile node 500 transmits a secession request message to a mobile multicast agent where the mobile node joins at step S400. The secession request message means that the mobile node 400 does not need the multicasting service corresponding to the session of the mobile multicast agent 410 any more.

After receiving the session secession request at the step S400, the mobile multicast agent 410 approves the session secession request from the mobile node 500 at step S401, and does not provide the multicast data to the corresponding mobile node 500 any more.

Figure 5:
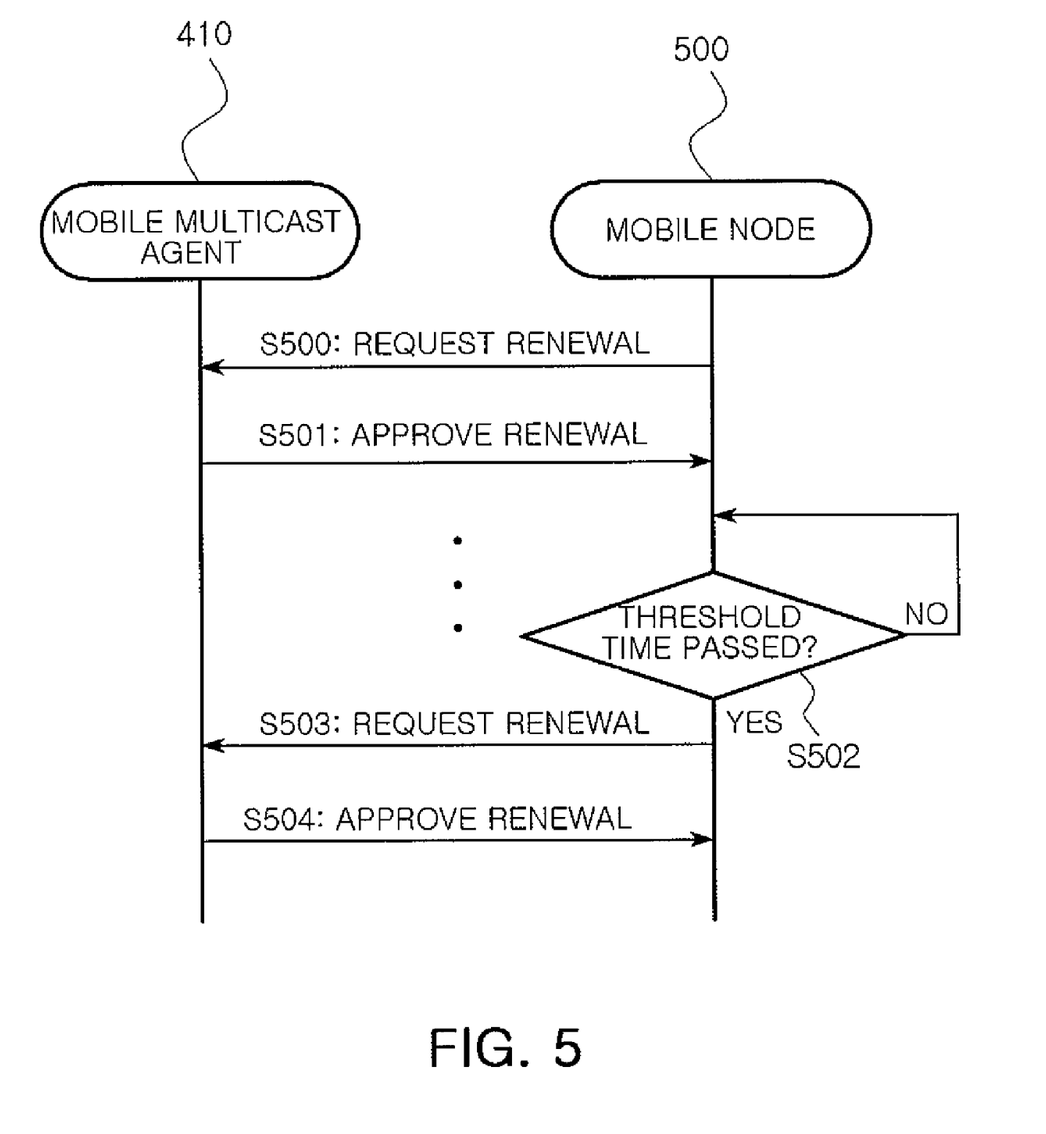
FIG. 5 is a flowchart illustrating a procedure for constantly receiving a corresponding multicasting service at a mobile node receiving multicast data from a predetermined mobile multicast agent through a wireless network.

FIG. 5 is a flowchart illustrating a procedure for constantly receiving a corresponding multicasting service at a mobile node receiving multicast data from a predetermined mobile multicast agent through a wireless network.

Referring to FIG. 5, the mobile node 500 generates and transmits a multicasting service renewal request message, and a corresponding mobile multicast agent 410 receives the multicasting service renewal request message at step S500.

Then, the mobile multicast agent 410 determines whether the corresponding multicast data of a corresponding session is provided to the mobile node 500 or not. If the mobile multicast agent 410 accepts the existence of the mobile node 500, the mobile multicast agent 410 transmits a renewal approval message to the mobile node 500 at step S501.

After the mobile node 500 receives the renewal approval message at the step S501, the mobile node 500 re-transmits a service renewal request message within a predetermined threshold time at step S503.

After receiving the service renewal request message at the step S503, the mobile multicast agent 410 determines whether or not multicast data for a corresponding session for a corresponding mobile node 500 is provided or not, and transmits a renewal approval message at step S504 if the existence of the mobile node 500 is accepted.

The resources of the wireless network become exhausted if the mobile multicast agent continuously forwards the multimedia data to the wireless network including no valid mobile nodes. Therefore, the service renewal request is repeatedly transmitted at a predetermined threshold time in order to prevent the resource from being wasted.

Hereinafter, a procedure of continuously receiving a previous multicasting service at a mobile node through a foreign network (FN), not an existing multicast file transmission network, when a mobile node performs handover from a first wireless network to a second wireless network will be described with reference to FIG. 6 to FIG. 8.

Figure 6:
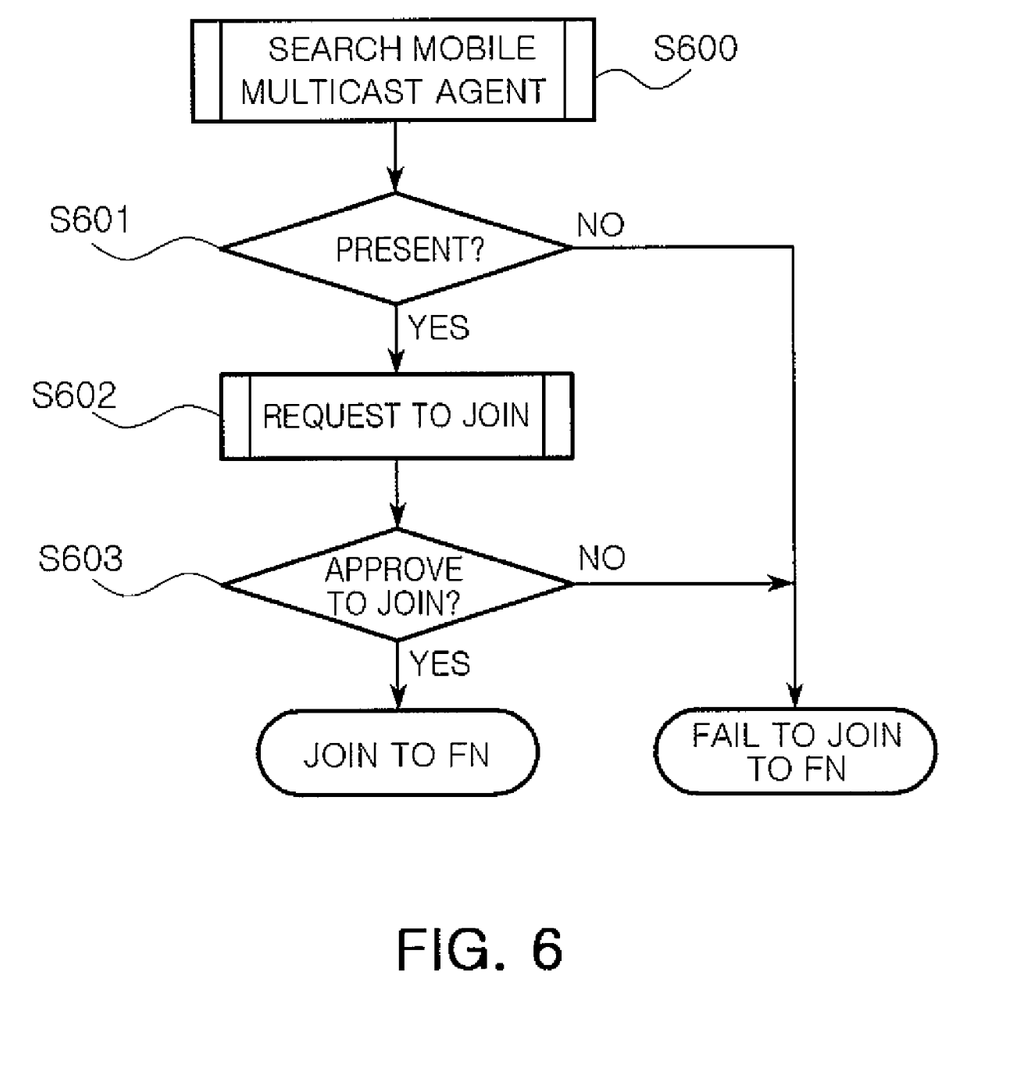
FIG. 6 is a flowchart illustrating a procedure that a mobile node joins to a foreign network providing a multicasting service to the second wireless network when the mobile node performs handover from a first wireless network to a second wireless network.

FIG. 6 is a flowchart illustrating a procedure that a mobile node joins to a foreign network providing a multicasting service to the second wireless network when the mobile node performs handover from a first wireless network to a second wireless network.

Referring to FIG. 6, a mobile node performs handover from a first wireless network to a second wireless network and determines whether a mobile multicast agent is present in a foreign network providing a multicasting service to the second wireless network or not at step S600.

If the mobile node searches that the mobile multicast agent is present in the foreign network at step S600, the mobile node requests the searched mobile multicast agent to join a service at step S602.

If the mobile node successfully joins to the mobile multicast agent by receiving a joining approval message from the searched mobile multicast agent, the mobile node provides the multicasting service for the second wireless network through the foreign network.

If a mobile multicast agent is not present in the foreign network, or if the searched mobile multicast agent in the foreign network does not approve the mobile network to join, the mobile node fails to join to the foreign network.

Figure 7:
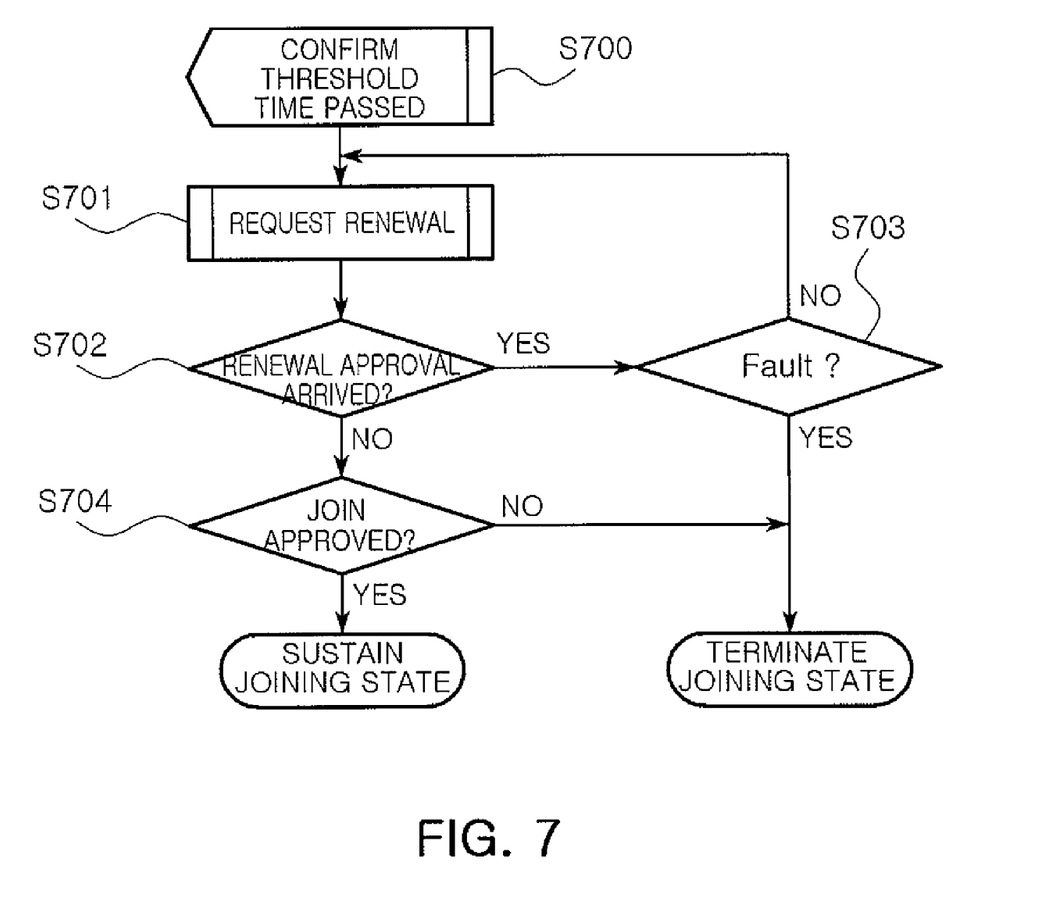
FIG. 7 is a flowchart illustrating a procedure that a mobile node continuously performs multicast communication after joining to a foreign network for a second mobile network as shown in FIG. 6.

FIG. 7 is a flowchart illustrating a procedure that a mobile node continuously performs multicast communication after joining to a foreign network for a second mobile network as shown in FIG. 6.

Referring to FIG. 7, after a mobile node joins to a foreign network and receives a multicasting service, the mobile node determines whether a threshold time is passed or not at step S700. Then, the mobile node requests the mobile multicast agent to renew at step S701.

If the mobile node does not receive a renewal approval message from the mobile multicast agent within a predetermined time at step S702, the mobile node confirms whether it is a system error or not at step S703. According to the determination result, the mobile node terminates the joining state or requests to renew again.

If the mobile node receives the renewal approval message at step S702, the mobile node confirms whether the mobile multicast agent accepts the renewal request or not based on the renewal approval message at step S704.

If the mobile multicast agent accepts the renewal request the mobile node sustains a joining state, but if the mobile multicast agent does not accept the mobile node terminates the joining state.

Figure 8:
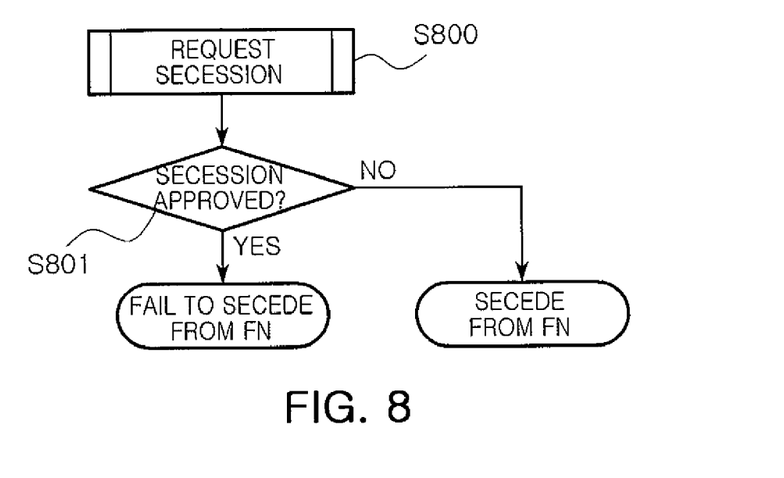
FIG. 8 is a flowchart illustrating a procedure that a mobile node joining to a foreign network for a second wireless network leaves the foreign network as shown in FIG. 6.

FIG. 8 is a flowchart illustrating a procedure that a mobile node joining to a foreign network for a second wireless network leaves the foreign network as shown in FIG. 6. The mobile node leaves the foreign network because the mobile node in the second wireless network performs handover to the third wireless network, or the mobile node terminates the operation of receiving the corresponding multicasting service.

Referring to FIG. 8, the mobile node transmits a secession request message to a mobile multicast agent of a corresponding foreign network where the mobile node joins at step S800. If the mobile node receives a response message that allows the mobile node to secede from the mobile multicast agent, the mobile node successfully secedes from the foreign network.

Hereinafter, a procedure that a mobile node continuously receives an existing multicasting service through a mobile multicast agent providing a multicasting service to a second wireless network while the mobile node performs handover from a first wireless network to a second wireless network will be described with reference to FIG. 9 to FIG. 11.

Figure 9:
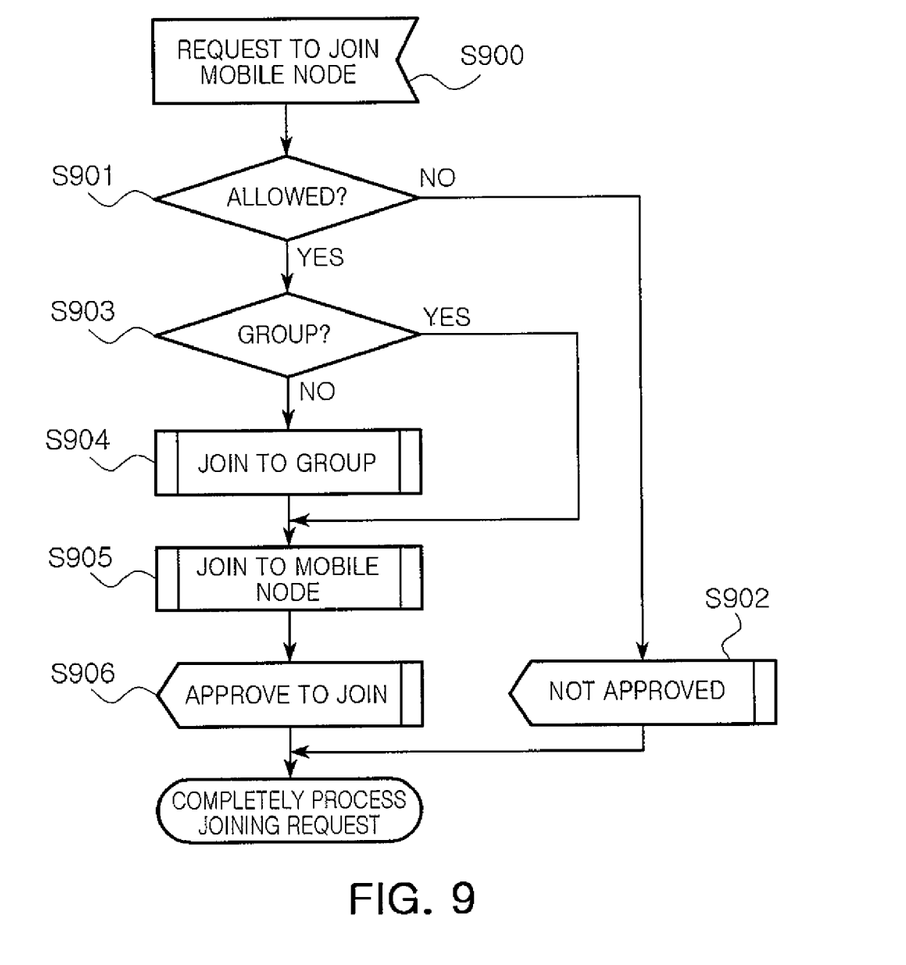
FIG. 9 is a flowchart illustrating a procedure that a mobile node joins to a mobile multicast agent providing a multicasting service to the second wireless network by performing handover from a first wireless network to the second wireless network.

FIG. 9 is a flowchart illustrating a procedure that a mobile node joins to a mobile multicast agent providing a multicasting service to the second wireless network by performing handover from a first wireless network to the second wireless network.

Referring to FIG. 9, a mobile node transmits a joining request message to a mobile multicast agent at step S900.

The mobile multicast agent received the joining request message determines whether a corresponding multicast service can be provided to the mobile node or not at step S901.

If the mobile multicast agent determines that the corresponding service cannot be provided at the step S901, the mobile multicast agent refuses the joining request and terminates the corresponding process at step S902.

If the mobile multicast agent determines that the corresponding service can be provided at the step S901, the mobile multicast agent further determines whether a multicasting group related to a requested multicasting service from a mobile node is currently provided to the mobile node or not at step S903. The information about the service group may be stored in a predetermined space using various methods such as database.

If the mobile multicast agent does not service the multicasting group related to the requested multicasting service, the mobile multicast agent joins to the multicasting group at step S904. That is, the mobile multicast agent joins to the multicasting group for setting a path to transfer data transmitted from a sender in a wired or wireless environment to the mobile multicast agent through multicast agents in a plurality of wired environments.

Then, the mobile multicast agent processes the joining request of step S905, and approves the mobile node to join at step S906. At the step S905, the profile of multicast data transmitted to the mobile node can be provided.

Figure 10:
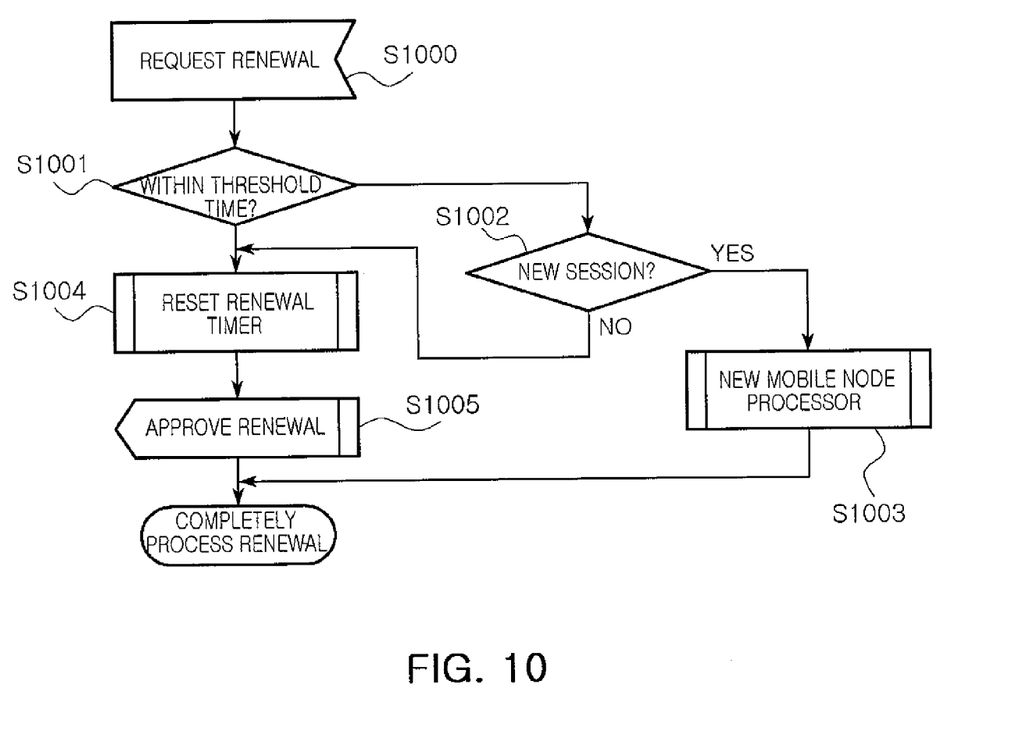
FIG. 10 is a flowchart illustrating a procedure that a mobile node joining to a foreign network for a second wireless network shown in FIG. 9 continuously performs multicast communication.

FIG. 10 is a flowchart illustrating a procedure that a mobile node joining to a foreign network for a second wireless network shown in FIG. 9 continuously performs multicast communication.

Referring to FIG. 10, when the multicast agent receives a renewal request from a mobile node at step S1000, the multicast agent determines whether the renewal request receives within a threshold time or not at step S1001. If the multicast agent receives the renewal request within the threshold time, the multicast agent resets the renewal timer at step S1004 and approves the renewal request of the mobile node at step S1005, thereby terminating the renewal procedure.

If the multicast agent does not receive the renewal request within the threshold time at step S1001, the mobile multicast agent determines whether a corresponding multicasting service session is terminated or not at step S1002. When a mobile multicast agent forwards mass capacity multimedia data although a mobile node requiring the corresponding service is not present in a corresponding network, the resource (bandwidth) of the wireless network and the system resource of the mobile multicast agent are wasted. In order to prevent the resource from being wasted, the mobile multicast agent terminates the multicasting service session provided to a predetermined mobile node. Therefore, the mobile multicast agent determines whether a corresponding multicasting service session is terminated or not at the step S1002 as described above.

If a corresponding session is still existed, the mobile multicast agent constantly provides the service at steps S1004 and S1005.

When the session requested by the mobile node is already terminated, the mobile multicast agent recognizes the mobile node requesting the renewal as a new mobile node. Therefore, the mobile multicast agent performs an operation of joining to a new mobile node at step S1003, thereby terminating the renewal operation.

Figure 11:
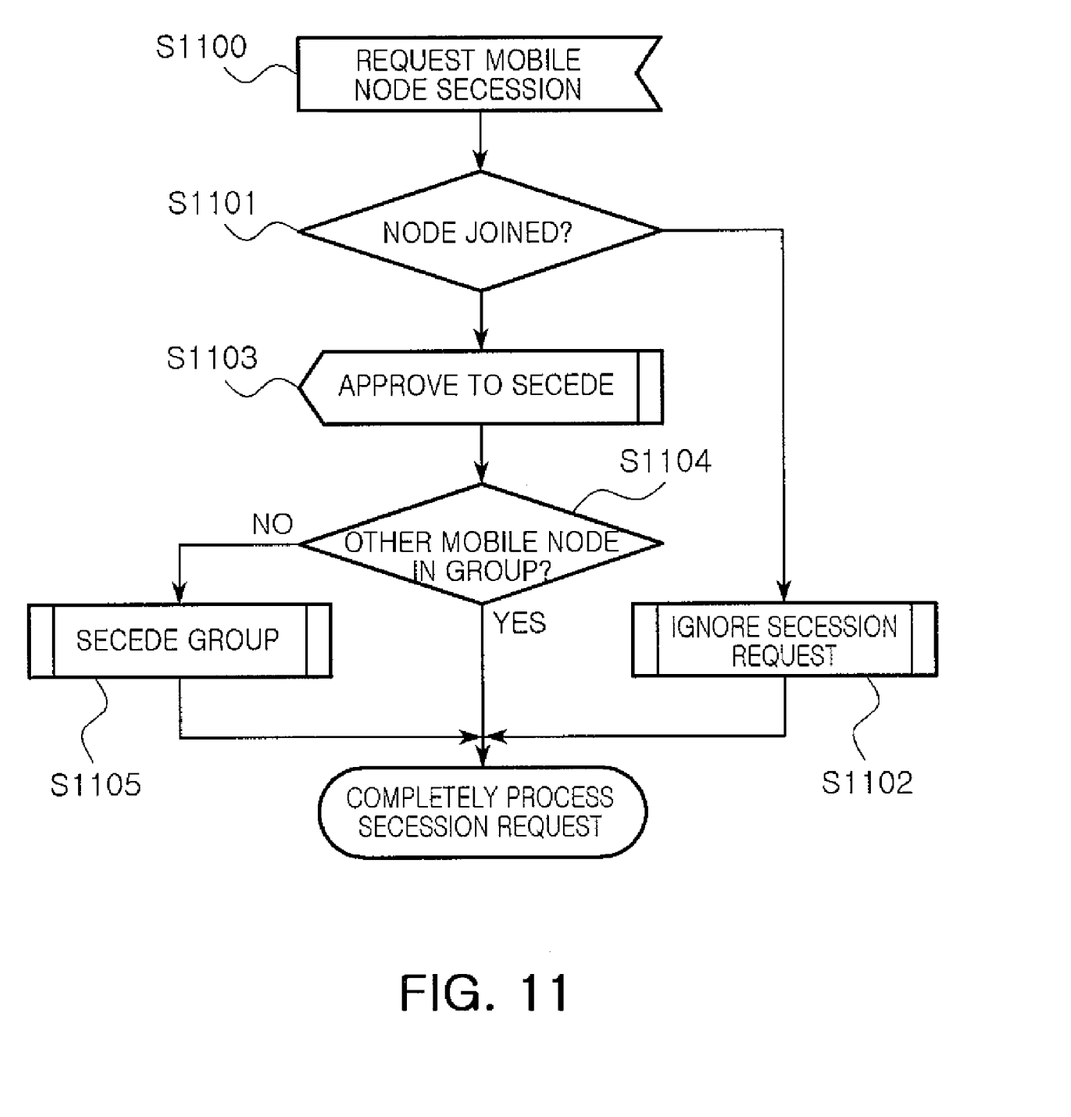
FIG. 11 is a flowchart illustrating a procedure that a mobile multicast agent processes a secession request of a mobile node.

FIG. 11 is a flowchart illustrating a procedure that a mobile multicast agent processes a secession request of a mobile node. Herein, the secession process is performed when a mobile node dose not require the multicasting service session any more due to migration to a foreign network or mobile node termination. In case of using the secession request, the resource of a wireless network can be more saved compared to terminating a session by a timer.

Referring to FIG. 11, when the mobile multicast agent receives a secession request of a mobile node at step S1100, the mobile multicast agent determines whether the mobile node is joined to a multicasting group provided from the mobile multicast agent at step S1101. If the mobile node is not joined to the multicasting group, the mobile multicast agent ignores the secession request at step S1102.

If the mobile node is joined the multicasting group service, the mobile multicast agent approves the secession request of the mobile node at step S1103. Also, the mobile multicast agent determines whether there are more mobile nodes joined the multicasting group service with the mobile node seceded at step S1104.

If there is not mobile node joining the multicasting group service, the mobile node secedes from the corresponding group at step S1105.

If the mobile multicast agent needs to continuously provide the corresponding service because there are mobile nodes requiring the multicasting group service at step S1104, the mobile multicast agent does not secede from the group but performs the secession operation for only a predetermined mobile node.

Hereinafter, the operation of a session manager when a mobile node continuously receives an existing multicasting service through a mobile multicast agent providing a multicasting service from a second mobile network while the mobile node performs handover from a first wireless network to a second wireless network will be described with reference to FIG. 12 to FIG. 14.

Figure 12:
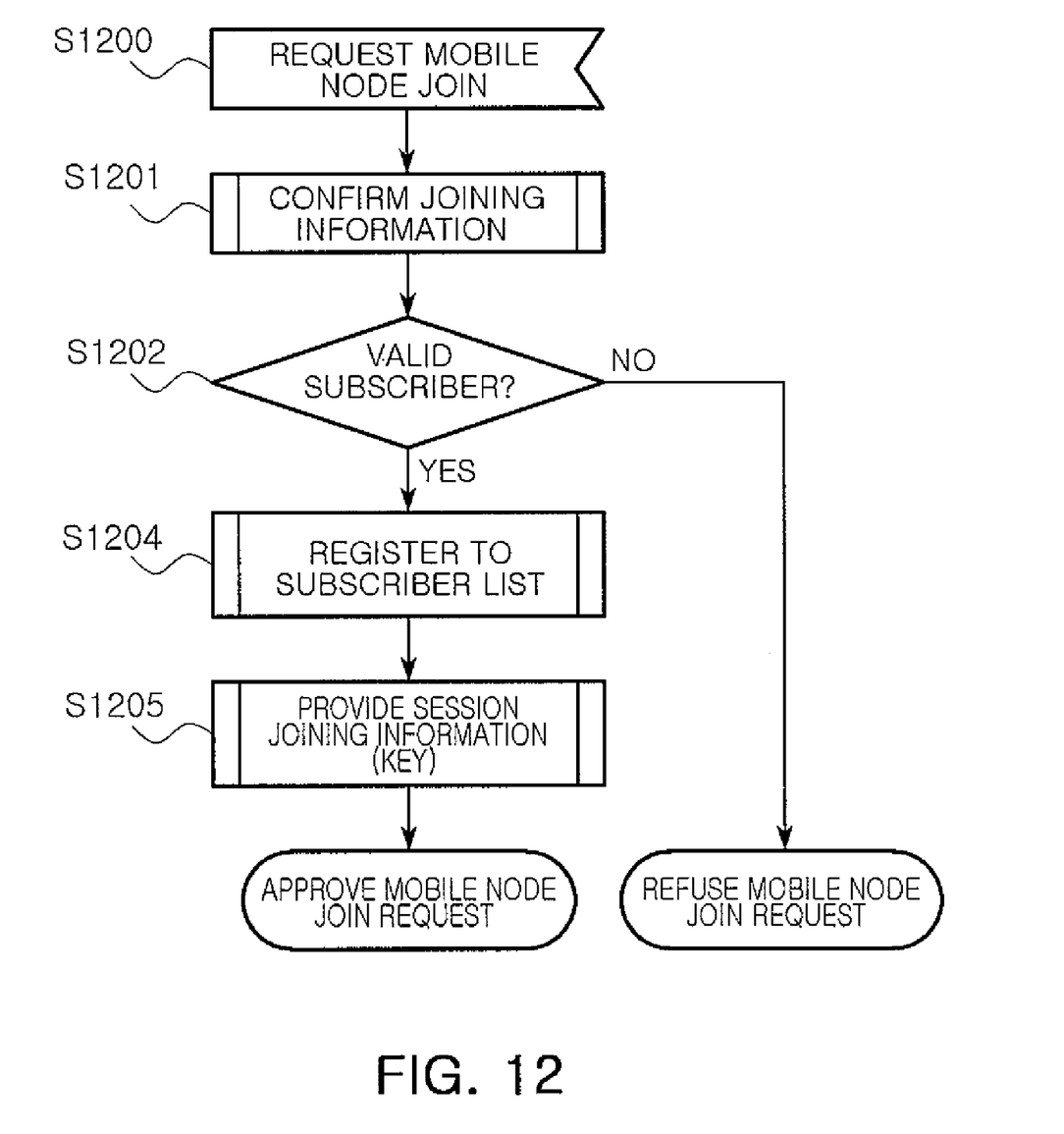
FIG. 12 is a flowchart illustrating the operation of a session manager when a new mobile multicast agent or a new mobile node initially joins to a multicast service.

FIG. 12 is a flowchart illustrating the operation of a session manager when a new mobile multicast agent or a new mobile node initially joins to a multicast service.

Referring to FIG. 12, the session manager receives a joining request message from a new mobile multicast agent or a mobile node at step S1200, the mobile multicast agent or the mobile node confirms the joining information of the mobile node at step S1201.

Based on the joining information, the session manager determines whether the joining of the new mobile multicast agent or the mobile node is a valid subscriber or not at step S1202. If it is not valid subscriber, the session manager refuses the joining of the mobile multicast agent or the mobile node.

If the joining of the new mobile multicast agent or the mobile node is valid subscriber at the step S1202, the joining information is registered at the member list at step S1204. The session manager can manage the member list in a database.

Then, the session manager transmits supplementary information such as a group key to a new mobile multicast agent or mobile node in order to enable the new mobile multicast agent or mobile node to join to a session at step S1205, thereby accepting the mobile node to join.

Figure 13:
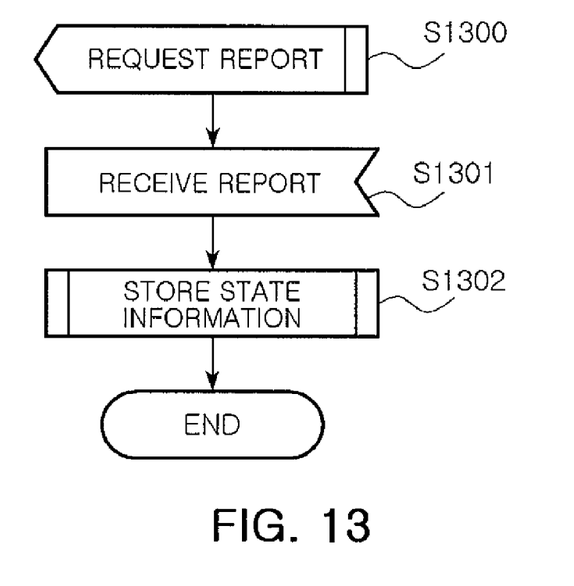
FIG. 13 is a flowchart illustrating a procedure that a session manager monitors a mobile multicast agent or a mobile node when a multicast communication service is constantly provided.

FIG. 13 is a flowchart illustrating a procedure that a session manager monitors a mobile multicast agent or a mobile node when a multicast communication service is constantly provided.

Referring to FIG. 13, a session manager requests a mobile multicast agent or a mobile node to report the states thereof at step S1300, and receives the state reports from the corresponding nodes at step S1302.

Then, the session manager stores the state information of the mobile node or the mobile multicast agent in the own database at step S1303.

Figure 14:
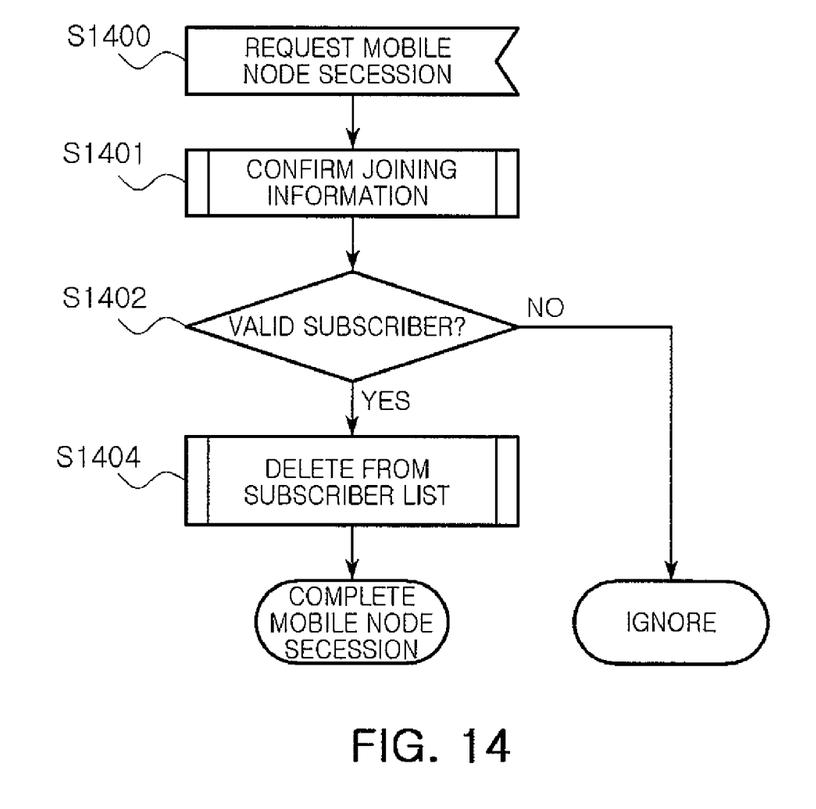
FIG. 14 is a flowchart illustrating the operation of a session manager when a mobile node normally terminates multicast communication.

FIG. 14 is a flowchart illustrating the operation of a session manager when a mobile node normally terminates multicast communication. Referring to FIG. 14, when a session manager receives a secession request message from a mobile node or a mobile multicast agent at step S1400, the session manager obtains a joining information of the mobile node or the mobile multicast agent requesting the secession through the database and confirms whether the mobile node or the mobile multicast agent is a valid subscriber or not at step S1401.

If the mobile multicast agent or the mobile node is the valid subscriber at step S1402, the session manager deleted the corresponding joining information from the database and finishes the session operation at step S1403.

Hereinafter, a handover operation to continuously receive the existing multicasting service through the second wireless network, which was used to receive through the first wireless network, when the mobile node moves from the first wireless network to the second wireless network will be described with reference to FIG. 15 and FIG. 16.

Figure 15:
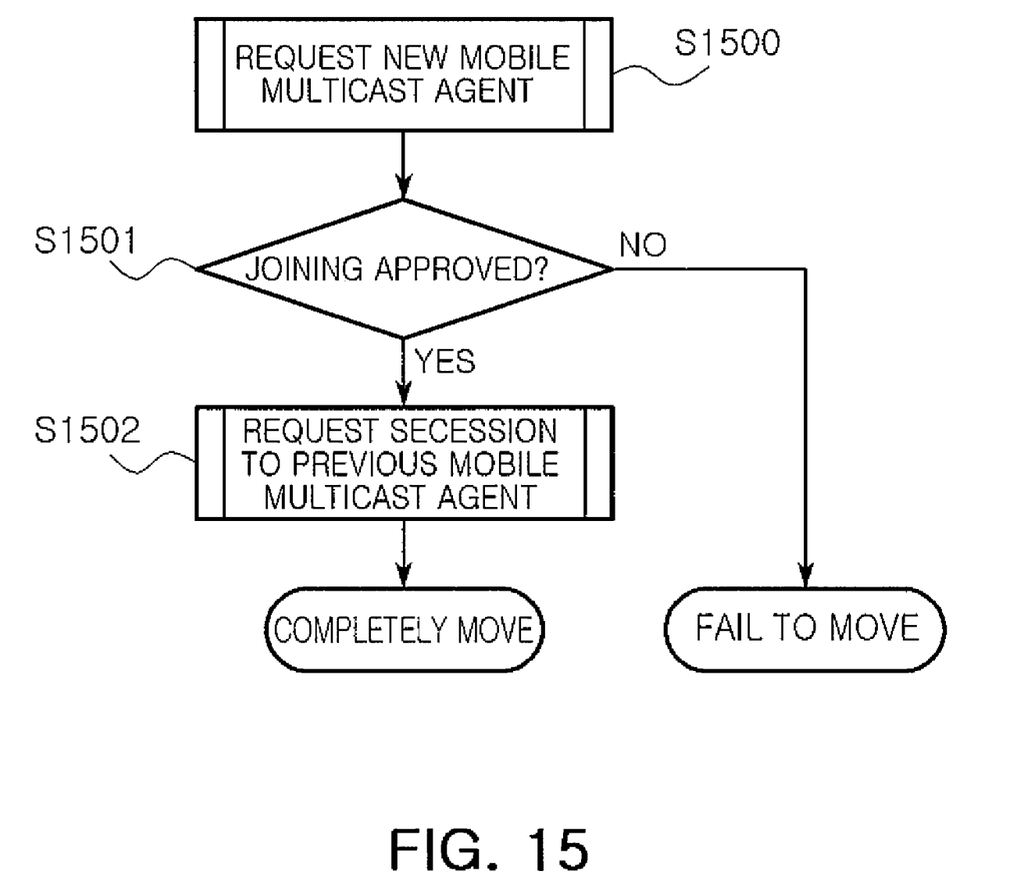
FIG. 15 is a flowchart illustrating a handover operation when a mobile node receiving a multicasting server moves to other wireless network.

FIG. 15 is a flowchart illustrating a handover operation when a mobile node receiving a multicasting server moves to other wireless network.

Referring to FIG. 15, when the mobile node moves from the first wireless network to the second wireless network, the mobile node requests a mobile multicast agent managing a multicasting server in a second wireless network to newly join at step S1500.

If the mobile node receives the join approval from the mobile multicast agent of the second wireless network at step S1501, the mobile node transmits a secession request to a previous mobile multicast agent managing a multicasting service in the first wireless network and finishes the move operation at step S1503.

If the mobile multicast agent of the second wireless network refuses the joining request of the mobile node, the move operation is failed.

Figure 16:
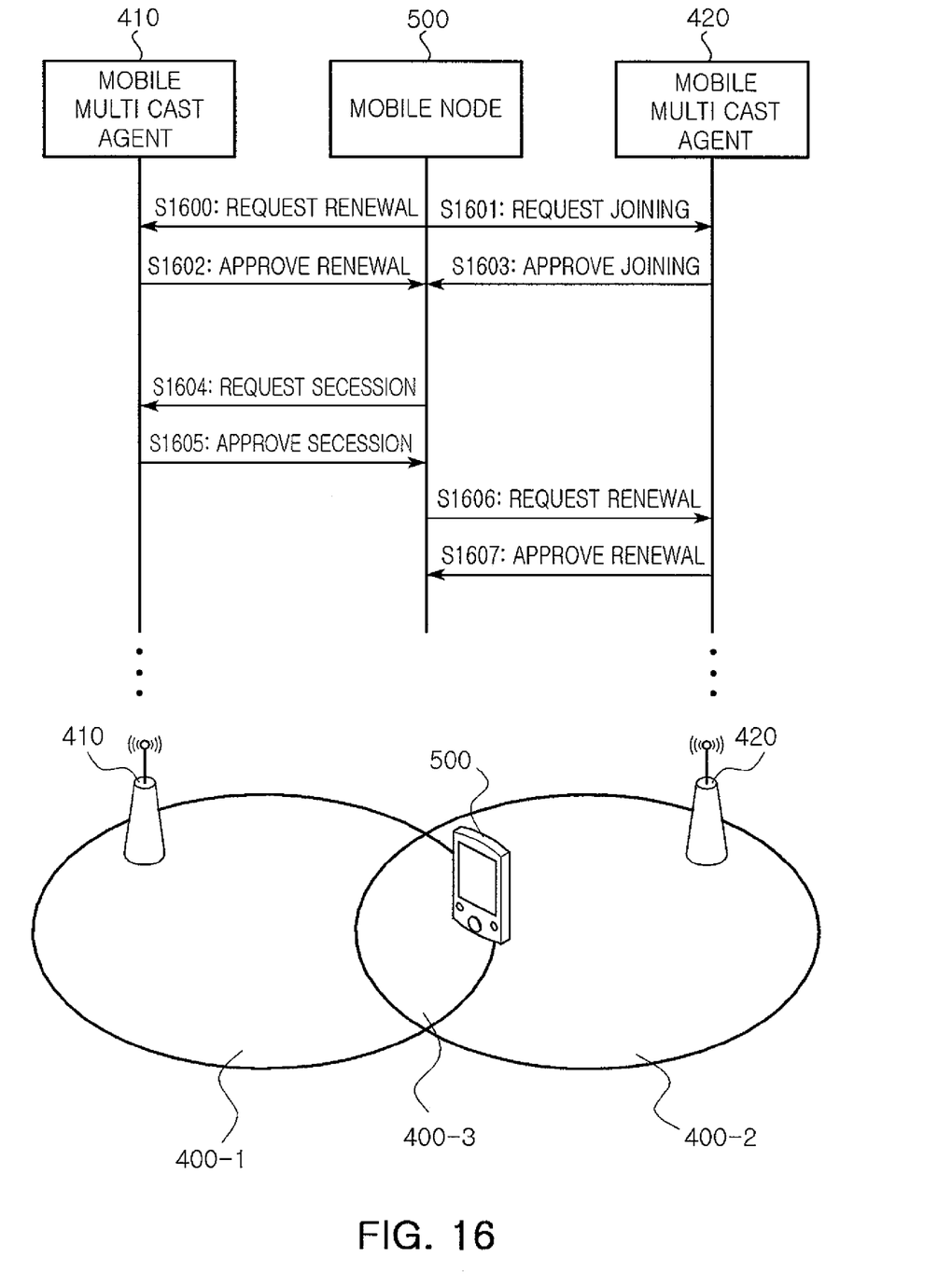
FIG. 16 is a flowchart illustrating a procedure of signaling between a mobile node and a mobile multicast agent when a handover operation is performed to continuously receive an existing multicasting service, which was used to be provided from the first wireless network, from the second wireless network when a mobile node moves from the first wireless network to the second wireless network.

FIG. 16 is a flowchart illustrating a procedure of signaling between a mobile node and a mobile multicast agent when a handover operation is performed to continuously receive an existing multicasting service, which was used to be provided from the first wireless network, from the second wireless network when a mobile node moves from the first wireless network to the second wireless network.

Referring to FIG. 16, when a mobile node 500 wants to move the first wireless network 400-1 to the second wireless network 400-2, the mobile node 500 transmits a renewal request message to a mobile multicast agent 410 providing a current multicasting service at the first wireless network 400-1 at step S1600. Also, the mobile node 500 transmits a joining request message to a mobile multicast agent 420 providing a multicasting service at the second wireless network 400-2 at step S1601. If the mobile node 500 receives a renewal approval message from the first mobile multicast agent 410 at step S1602 and receives a joining approval message from the second mobile multicast agent 420 at step S1603, the mobile node 500 transmits the secession request to the first mobile multicast agent 410 at step S1604.

If the mobile node 500 receives a secession approval from the first mobile multicast agent 410 at step S1605 and successfully joins to the second mobile multicast agent 420, the mobile node 500 transmits the renewal request to the second mobile multicast agent 420 at step S1605 and receives the renewal approval from new mobile multicast agent 420 at step S1607.

When the mobile node 500 moves from the first wireless network 400-1 to the second wireless network 400-2, there must be an intermediate zone 400-3 where the mobile node 500 could receive the multicasting services from the first wireless network 400-1 and the second wireless network 400-2. In order to prevent the mobile node 500 from receiving the same data repeatedly, a multicast address hoping scheme changing a group address used to transmit data may be used when data is transmitted to an adjacent mobile network. The mobile multicast agent manager allocates a multicast address for the hopping according to a network topology.

According to the certain embodiment of the present invention, the multicast service can be effectively provided without changing the conventional network structure in the wired and wireless integrated Internet environment. Also, the mobile node can quickly perform handover, and the data transmission tree is not required to reform.

While the present invention has been shown and described in connection with the preferred embodiments, it will be apparent to those skilled in the art that modifications and variations can be made without departing from the spirit and scope of the invention as defined by the appended claims.

What is claimed is:

1. A wireless multicasting service method using a relayed transmission scheme for a plurality of wireless networks, between which a mobile node moves, comprising:
   when the mobile node moves from a first wireless network to a second wireless network, performing a new joining request to a mobile multicast agent managing a multicasting service in the second wireless network;
   performing a multicasting service renewal request to a previous mobile multicast agent in the first wireless network; and
   performing a secession request to the previous mobile multicast agent managing a multicasting service in the first wireless network if the mobile node receives both a joining approval for the new joining request and a renewal approval for the multicasting service renewal request.

2. The wireless multicasting service method according to claim 1, wherein the step of performing the new joining request to the mobile multicast agent includes:
   searching by the mobile node, a mobile multicast agent transmitting multicast data in the second wireless network;
   collecting information about the searched mobile multicast agent;
   requesting the searched mobile multicast agent to join a service based on the collected information; and
   receiving a joining approval message from the searched mobile multicast agent in response to the request.

3. The wireless multicasting service method according to claim 2, wherein all control messages exchanged between the mobile node and the searched mobile multicast agent uses an offset multicast address.

4. The wireless multicasting service method according to claim 2, wherein the collected information is at least one of information about identification of the searched mobile multicast agent, a quality of service and a service renewal cycle time, which provided from the searched mobile multicast agent.

5. The wireless multicasting service method according to claim 2, in the step of requesting the searched mobile multicast agent to join a service, the mobile node uses a message including at least one of address information of a session to join, join authentication information, information about a previous mobile multicast agent, data profile, and estimated service time information.

6. The wireless multicasting service method according to claim 2, wherein the joining approval message includes at least one of session address information, mobile multicast agent information, negotiated data profile information, and joining request renewal cycle time information.

7. The wireless multicasting service method according to claim 1, further comprising transmitting a further multicasting service renewal request to a mobile multicast agent where the mobile node joins to.

8. The wireless multicasting service method according to claim 7, wherein the further renewal request is regularly performed by a threshold time.

9. The wireless multicasting service method according to claim 1, wherein the step of searching a multicast agent includes:
- judging by the mobile node, whether a particular mobile multicast agent transmitting multicast data is present in the second wireless network, by exchanging messages between the mobile node and the particular mobile multicast agent using a multicast address; and
- when the mobile node judges that the particular mobile multicast agent is present in the second wireless network, performing a new joining request to the particular mobile multicast agent.

10. A wireless multicasting service method using a relayed transmission scheme, comprising:
- receiving a new joining request from a mobile node receiving a multicasting service from a neighbor wireless network;
- judging whether the multicasting service is provided;
- processing the join of the mobile node, when it is judged that the multicasting service is provided;
- joining a multicasting group related to the multicasting service and processing the join of the mobile node, when it is judged that the multicasting service is not provided;
- receiving a renewal request from the mobile node;
- judging whether the renewal request is received within a threshold time or not; and
- approving the renewal request when it is judged that the renewal request is received within the threshold time.

11. The wireless multicasting service method according to claim 10, wherein the step of processing the join of the mobile node includes providing a profile of multicast data to transfer to the mobile node.

12. The wireless multicasting service method according to claim 10, wherein the step of joining a multicasting group related the multicasting service includes:
- joining the multicasting group for setting a path to receive data transmitted from a sender in a wired or wireless network through multicast agents in a plurality of wired networks.

13. The wireless multicasting service method according to claim 10, further comprising:
- judging whether the multicasting service is terminated or not, when it is judged that the renewal request is not received within the threshold time;
- approving the renewal request when it is judged that the multicasting service is not terminated; and
- receiving the new joining request from the mobile node when it is judged that the multicasting service is terminated.

* * * * *